(12) United States Patent
Reohr, Jr. et al.

(10) Patent No.: US 6,741,602 B1
(45) Date of Patent: May 25, 2004

(54) WORK QUEUE ALIAS SYSTEM AND METHOD ALLOWING FABRIC MANAGEMENT PACKETS ON ALL PORTS OF A CLUSTER ADAPTER

(75) Inventors: Richard D. Reohr, Jr., Hillsboro, OR (US); Dean S. Susnow, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,263

(22) Filed: Mar. 30, 2000

(51) Int. Cl.⁷ .............................................. H04L 12/28
(52) U.S. Cl. ..................... 370/412; 370/419; 370/413; 370/465
(58) Field of Search ................................ 370/236, 250, 370/389, 392, 395.4, 397, 399, 412, 413, 415, 386, 395.1, 400, 403, 404, 406, 417, 419, 465

(56) References Cited

U.S. PATENT DOCUMENTS 5,838,994 A * 11/1998 Valizadeh ................... 370/236
5,862,136 A * 1/1999 Irwin ....................... 370/395.4
6,594,237 B1 * 7/2003 Kiuchi et al. ................ 370/250

* cited by examiner

Primary Examiner—Phirin Sam
(74) Attorney, Agent, or Firm—Schwegman, Lundberg, Woessner & Kluth, P.A.

(57) ABSTRACT

A device, method and computer program to receive and identify incoming cell data transmitted to a cluster adapter as a request for acknowledgment from a fabric manager server so that the fabric manager server may configure a computer network. This device, method and computer allows for devices in the network to have many ports simultaneously connected to the network and still be able to receive the same request for acknowledgment on all ports without the request for acknowledgment being overwritten by other requests coming in on different ports on the same device. This is accomplished by using a fabric manager packet alias reception circuit embedded in each port to substitute the destination work queue field having a value of zero for the contents of a fabric management packet alias register located in each port. The device then responds to the request for acknowledgment and a fabric management packet alias transmission circuit then replaces the source work queue field with the value zero so that the fabric manager server will recognize the response as an acknowledgment of the device's presence.

20 Claims, 8 Drawing Sheets

| 7 | 4 | 3 | 0 | — 250 |
|---|---|---|---|---|
| VERSION | | PRIORITY | | — 260 |
| DESTINATION MAC ID (LSB) | | | | |
| DESTINATION MAC ID (MSB) | | | | — 270 |
| DESTINATION WQ (LSB) | | | | |
| DESTINATION WQ (MSB) | | | | — 280 |
| SOURCE MAC ID (LSB) | | | | |
| SOURCE MAC ID (MSB) | | | | — 290 |
| SOURCE WQ (LSB) | | | | |
| SOURCE WQ (MSB) | | | | — 300 |
| OPCODE | | | | — 310 |
| PACKET SEQUENCE NUMBER | | | | — 320 |
| RESERVED | | | | — 330 |
| CELL SEQUENCE NUMBER | | | | — 340 |
| CELL LENGTH (LSB) | | | | |
| CELL LENGTH (MSB) | | | | — 350 |
| RESERVED | | | | — 360 |

WORK QUEUE ALIAS SYSTEM AND METHOD ALLOWING FABRIC MANAGEMENT PACKETS ON ALL PORTS OF A CLUSTER ADAPTER

FIELD

The invention relates to a work queue alias system and method to allow for work queue fabric management packets on all ports of a host channel adapter.

BACKGROUND

In the rapid development of computers many advancements have been seen in the areas of processor speed, throughput, communications, and fault tolerance. Initially computer systems were standalone devices in which a processor, memory and peripheral devices all communicated through a single bus. Later, in order to improve performance, several processors were interconnected to memory and peripherals using one or more buses. In addition, separate computer systems were linked together through different communications mechanisms such as, shared memory, serial and parallel ports, local area networks (LAN) and wide area networks (WAN). However, these mechanisms have proven to be relatively slow and subject to interruptions and failures when a critical communications component fails. Further, many of these types of architectures have lacked the flexibility to add or delete hardware without significant software reconfiguration.

One type of architecture of many that has been developed to improve throughput, allow for parallel processing, and to some extent, improve the robustness of a computer network is called a hypercube. Hypercube is a parallel processing architecture made up of binary multiples of computers (4, 8, 16, etc.). However, adding or deleting components in binary multiplies may prove to be overkill if all one needs is a single additional processor or device.

A hypercube like architecture, and many other types of networks and computer architectures, work well most of the time, but are inflexible and it is difficult to add or delete components when necessary. One solution to this inflexibility problem can be found in the new operating systems, such as Windows 2000™, in which each time the operating system is started a request for acknowledgment message is broadcast to all devices and each device responds to indicate it is present. This type of system works well when each device uses a single input port to interface to the computer system or network. When each device has a single input port, a generic request for acknowledgment can be sent to all devices. However, matters are complicated by the fact that the newer communications devices, such as switches and adapters, may have as many as four, eight or more full duplex ports. In a system or network in which a request for acknowledgment is sent to each port and a single switch or adapter has several ports, then a generic request for acknowledgment would be overwritten in the memory of the switch or adapter by each successive request for acknowledgment received by another port on the same device. This occurs because under normal operations a data packet sent to a port will have a memory location in its header where the data in the packet is to be written to in the memory of the device. However, in a request for acknowledgment the software does not know what devices, ports or memory locations exist in the system and thus the memory location specified has a zero value in the header portion of the request for acknowledgment data packet. Therefore, as each request for acknowledgment arrives at each port of the same device it overwrites the previous request since all these data packets specify memory location zero. This causes only a single response to be generated by the device and the system is not properly configured to recognize all ports on a given device.

Therefore, what is needed is a device and method that will, upon receipt of a request for acknowledgment at a given port in a device that has many ports, prevent other requests for acknowledgment from overwriting prior requests. Further, what is needed is, once each port on a device has received a request for acknowledgment, for the device to be able to respond with an acknowledgment from each separate port.

BRIEF DESCRIPTION OF THE DRAWINGS

The foregoing and a better understanding of the present invention will become apparent from the following detailed description of exemplary embodiments and the claims when read in connection with the accompanying drawings, all forming a part of the disclosure of this invention. While the foregoing and following written and illustrated disclosure focuses on disclosing example embodiments of the invention, it should be clearly understood that the same is by way of illustration and example only and the invention is not limited thereto. The spirit and scope of the present invention are limited only by the terms of the appended claims.

The following represents brief descriptions of the drawings, wherein:

FIG. 3 is an example of a header portion of a fabric management packet used by the embodiments the present invention;

DETAILED DESCRIPTION

Figure 1:
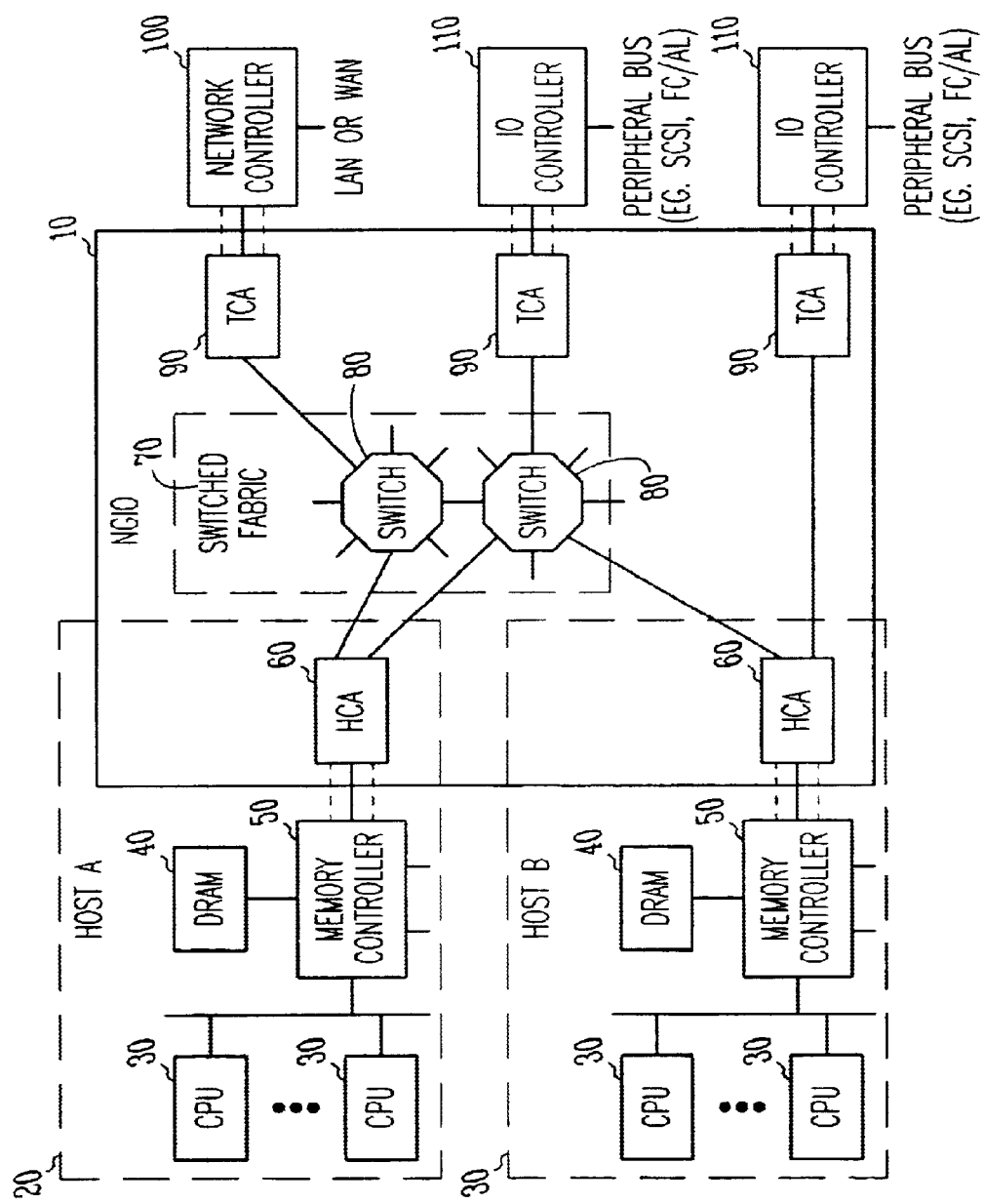
FIG. 1 is an example of an overall Next Generation Input/Output (NGIO) systems diagram.

Before beginning a detailed description of the subject invention, mention of the following is in order. When appropriate, like reference numerals and characters may be used to designate identical, corresponding or similar components in differing figure drawings. Further, in the detailed description to follow, exemplary sizes/models/values/ranges may be given, although the present invention is not limited to the same. As a final note, well-known components of computer networks may not be shown within the FIGS. for simplicity of illustration and discussion, and so as not to obscure the invention.

The present invention is directed to a device used to assign a work queue to a request for acknowledgment. This device has a first circuit embedded in a port to identify incoming cell data as a request for acknowledgment from a server. The first circuit assigns a predetermined work queue area assigned to the port for the request for acknowledgment to be placed in. The first circuit accomplishes this by replacing a field in the request for acknowledgment with the predetermined work queue area. This device also has a second circuit embedded in the port to identify outgoing cell data as the response to the request for acknowledgment. This second circuit sets the field in the response to the request for acknowledgment to zero before transmitting the response to the request for acknowledgment to the server.

FIG. 1 is an example of an overall Next Generation Input/Output (NGIO) 10 systems diagram which may be used by the embodiments of the present invention. Using such an NGIO 10 architecture it may be possible to link together a processor based system 20, through switches 80 to several Input/Output (I/O) controllers 110, network controllers 100, and other processor based systems 30. Each processor based system 20 and 30 may be composed of one or more central processing units (CPU) 30, dynamic random access memory (DRAM) 40, memory controller 50 and a host channel adapter (HCA) 60. A switching fabric 70 may be used to interconnect serial ports to achieve transfer rates of more than one gigabit-per-second.

Referring to FIG. 1, the NGIO 10 channel architecture defines interfaces that move data between two "memory" regions or nodes. Access to any I/O unit, such as I/O controller 110 and network controller 100, may be accomplished by send or receive operations, as well as, remote direct memory access (RDMA) read and RDMA write operations. Cluster or channel adapters provide the control and logic that allows nodes to communicate to each other over NGIO 10. There are two types of channel or cluster adapters. The first may be a host channel adapter (HCA) 60 and second may be a target channel adapter (TCA) 90. A processor based system 20 or 30 may have one or more HCAs 60 connected to it. Further, a network controller 100, and an I/O controller 110 may have one or more target channel adapters (TCA) 90 connected to it. Communications in a NGIO 10 architecture may be accomplished through these cluster adapters (HCA 60 or TCA 90) directly or through switches 80.

As can be seen in FIG. 1, the NGIO 10 architecture enables redundant communications links between HCAs 60, switches 80 and TCAs 90. Further, it may be possible to create a routing and distance table to identify the shortest paths between nodes in the network. In this case, distance is defined as being the shortest time between to points and not the physical distance. A node or cluster adapter 75, shown in FIG. 2, may be either a HCA 60 or a TCA 90. Therefore, when data is sent to a memory location in a node it will take the shortest path available and arrive as fast as possible. However, if a failure occurs to a switch 80 then an alternate path may have to be configured and the distance table would have to be computed again.

Figure 2:
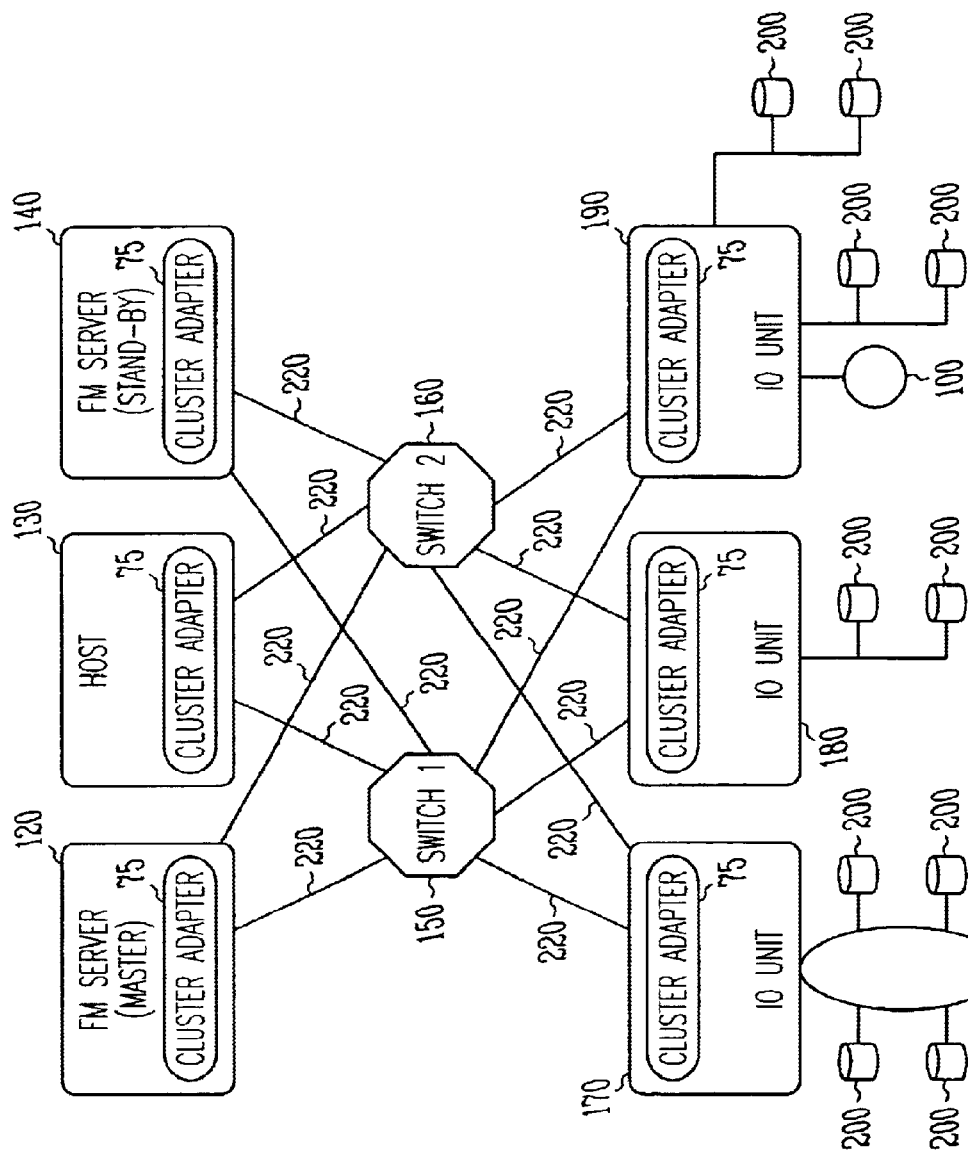
FIG. 2 is an example of a Next Generation Input/Output system diagram used in the example embodiments of the present invention.

FIG. 2 is another example of a NGIO 10 system architecture which may be used in the example embodiments of the present invention. In the NGIO 10 system architecture diagram shown in FIG. 2 all links 220 between master fabric manager (FM) server 120, host 130, standby FM server 140, switch 150, switch 160 and input/output (I/O) units 170, 180 and 190 are active as indicated by solid lines. A link 220 may be a bidirectional communication path between two connection points within the cluster NGIO 10 architecture. A cluster adapter 75, which refers to both a HCA 60 and a TCA 90, shown in FIG. 1, performs operations by exchanging packets of information with another cluster adapter 75. A server such as FM server 120, host 130 and FM server 140, may have one or more cluster adapters 75 and an input/output (I/O) unit, such as I/O unit 170, I/O unit 180 and I/O unit 190, may also have one or more cluster channel adapters 75. Each I/O unit, 170, 180 and 190, may support any number and type of peripheral and communications devices. For example I/O unit 170 has several disk drives 200 connected in a ring structure 210, while I/O units 180 and 190 also support numerous disk drives 200 on buses. Further, I/O unit 190 also supports a connection to a network controller 100 used to communicate to a LAN or WAN. Switches 150 and 160 are multi-port devices that forward or pass cells or packets of data between the ports of switch 150 and switch 160. Each switch 150 or 160 element contains within it a routing and distance table used to direct a packet of data to a node via the shortest path possible. A cluster adapter 75 (HCA 60 or TCA 90) performs its operations by exchanging packets of information with another cluster adapter 75 using links 220.

Still referring to FIG. 2, each component or node, in this example NGIO 10 architecture, such as master FM server 120, Host 130, standby server 140, switch 150 and 160, and I/O units 170, 180 and 190 are given a global unique identifier (GUID). This GUID uniquely enables each component to self-identify itself and may be 128 bits in length.

One of the benefits of employing an NGIO 10 architecture provided by example embodiment shown in FIG. 2 is that even when a complete failure occurs in either switch 150 or switch 160 communications may be still possible through the remaining working switch 150 or 160. Further, such an NGIO 10 or similar architecture provides exceptional flexibility in configuring a computer system or network of computer systems.

Still referring to FIG. 2, each port on each node including master FM server 120, Host 130, standby server 140, I/O units 170, 180, and 190 are labeled Media Access Controller Identifications (MAC ID). Further, each port of a cluster adapter 75 (HCA 60 and TCA 90) and all ports of a switch element (switch 150 and switch 160) are assigned a distinct MacId value by the master FM server 120 upon system startup. This cluster-wide unique MacId value may be used for routing decisions at each cluster component.

At this point in the discussion of the example embodiments of the present invention, the NGIO 10 architectures shown in FIGS. 1 and 2 are merely examples of the types of NGIO 10 architectures possible. Any number of variations in the configurations of nodes and switches is possible. The various configurations discussed in reference to the example embodiments should not be interpreted as narrowing the scope of the invention as provided in the claims.

FIG. 3 is an example header portion of a fabric management packet (FMP) 240 utilized by the embodiments of the present invention. The table shown in FIG. 3 is divided into rows holding eight bits per row as shown in data row 250. The first row of the header consists of a version identifier of the NGIO 10 architecture being used in bits 4 through 7 and a priority for this fabric management packet (FMP) 240 in bits 0 through 3 in row 260. A destination Macid 270 is divided into two rows in which the least significant bits (LSB) appear in the first row and the most significant bits appear in the second row. The destination Macid 270 is used to indicate which port this FMP 240 is to be delivered to. Thereafter, there appears in the FMP 240 header a destination work queue (WQ) 280 divided into a LSB portion and a MSB portion. The destination WQ 280 is used to identify the memory space in which the data packet is to be stored in the cluster adapter 75. Further, a source Macid 290 is provided to indicate the source of this FMP 240 and is also divided into a MSB portion and a LSB portion. A source WQ 300 is provided in FMP 240 to indicate the work queue in the source from which the data packet originated. When the destination WQ 280 and the source WQ 300 are equal to 0, this indicates to the cluster adapter 75 that this particular fabric management packet is requesting an acknowledgment from this particular port so that the network may be configured by the fabric manager (FM) server 120, shown in FIG. 2. The remainder of the header portion of the fabric management packet includes an operation code (Opcode) 310 indicative of the operation to be performed. A packet sequence number 320 is used to guarantee packet ordering. Two reserved rows 330 and 360 are provided for future usage. In addition, a cell sequence number 340 and a cell length 350 is further provided.

Figure 4:
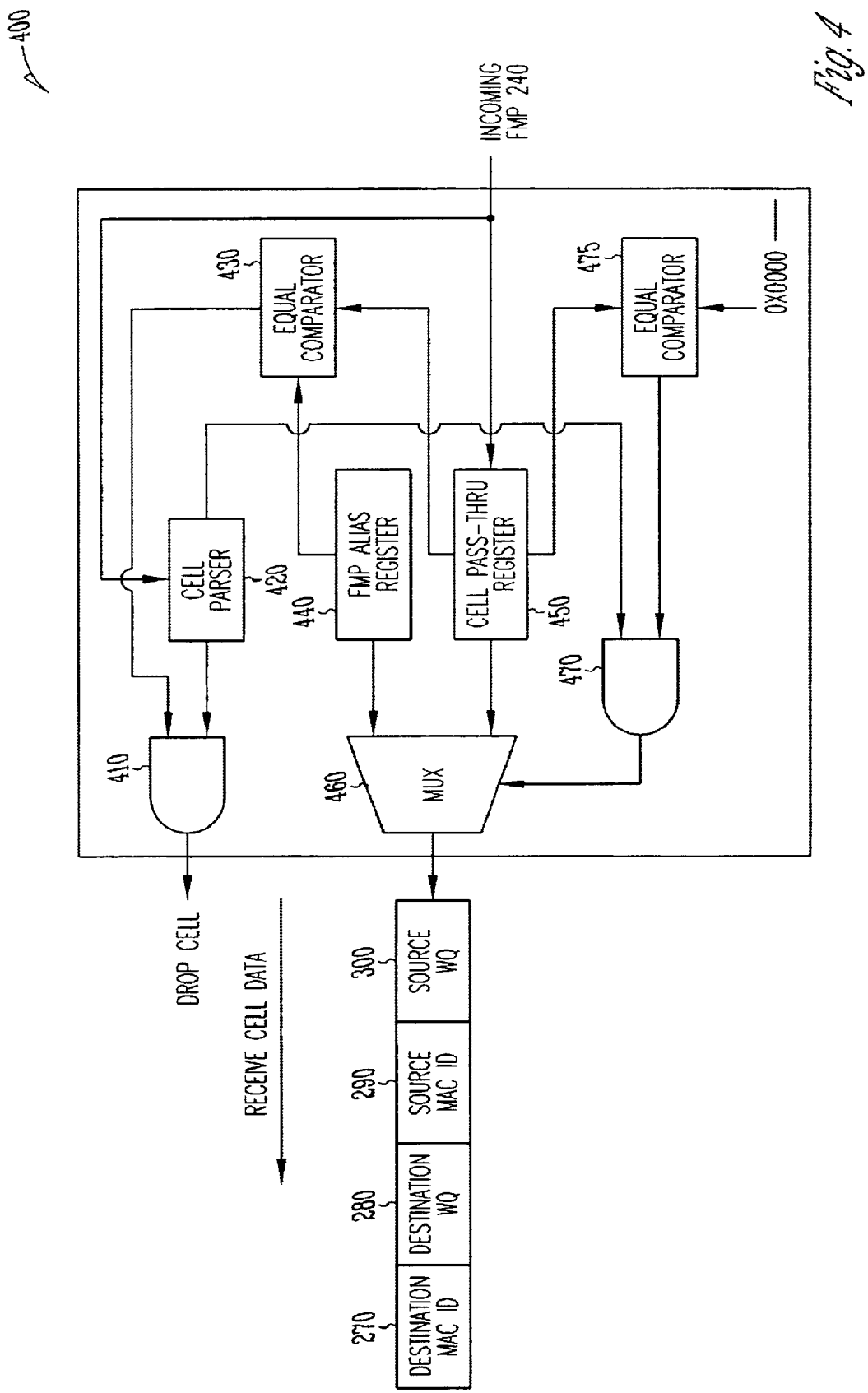
FIG. 4 is an example of a fabric management packet alias reception circuit used in an embodiment of the present invention.

FIG. 4 is an example of a FMP alias reception circuit 400, also referred to as a first circuit, used by the embodiments of the present invention. This FMP alias reception circuit 400 is contained within each port of a cluster adapter 75, shown in FIG. 2, and is used to replace the destination WQ 280 of the incoming cell with the contents of a FMP aliasing register 440 when the destination WQ 280 equals zero. This FMP aliasing register 440 is configured for each port upon initial start-up of the system by configuration software (not shown). This configuration software determines the number of ports on each cluster adapter 75 and sets the FMP alias register 440 to a unique value for each port. Thereafter, the FM server 120 proceeds to broadcast FMPs 240 having a source WQ 300 and a destination WQ 280 equal to zero and awaits responses from each port on each cluster adapter 75. Once the FM server 120 has received an acknowledgment from each port, the FM server 120 assigns a Macid for each port. Further, the FM server 120 generates distance tables for each switch 80 on the NGIO 10 network. The cluster adapter 75 acknowledges receipt of the FMP 240 by swapping the values contained in source WQ 300 and destination WQ 280 and transmitting the acknowledgment back to the FM server 120. As will be discussed further detail ahead, on reception of the FMP 240, the FMP alias reception circuit 400 replaces the contents of the destination WQ 280 with those of the FMP alias register 440 and on transmission of the FMP 240 to the FM server 120 the value contained in the destination WQ 280 is set to zero. Further, the cluster adapter 75 provides specific configuration information in the acknowledgment needed by the FM server 120 to configure the NGIO 10 architecture.

Referring to FIG. 4, the FMP alias reception circuit 400 receives the FMP 240 from the FM server 120 and identifies it as a FMP 240 by checking if the destination WQ 280 value is equal to zero. The FMP alias reception circuit 400 resides in the receive half of a full duplex port in the cluster adapter 75. Upon receipt of FMP 240 by the cluster adapter 75, the FMP 240 is first passed to the cell pass-thru register 450. The cell pass-thru register 450 then transmits a copy of the destination WQ 280 to the equal comparator 430, also referred to as a first equal comparator. The equal comparator 430 also receives a copy of the contents of the FMP alias register 440 and compares the two values. If the destination WQ 280 equals the value contained in the FMP a alias register 440, the equal comparator 430 transmits a signal to the AND gate 410 that is set to high or one, also referred to as a first input signal. Simultaneously, the cell parser 420 counts the number of bytes received in the FMP 240 and upon receipt of the fourth byte, which is where the destination WQ 280 is located as indicated in FIG. 3, the cell parser 420 also transmits a signal set to high or one, also referred to as a second input signal, to the AND gate 410. With both input signals to the AND gate 410 from the cell parser 420 and equal comparator 430 set to high or one, the AND gate 410, also referred to as a first AND gate, will be asserted to high or one causing, for a single clock cycle, the dropping of the entire FMP 240. This is done in order to prevent a device on the NGIO 10 architecture from writing to the area in the memory designated by the FMP alias register 440 and thereby inappropriately causing an acknowledgment to be transmitted to the FM server 120 by a cluster adapter 75.

Still referring to FIG. 4, if the destination WQ 280 is not equal to the value contained in the FMP alias register 440, then equal comparator 475, also referred to as the second equal comparator, determines whether destination WQ 280 is equal to zero indicating that the FM server 120 desires an acknowledgment. If the destination WQ 280 is equal to zero and the cell parser 240 has counted off four bytes, then both input signals to AND gate 470 are high or set to one and the output signal from the AND gate 470 is set high or equal to one. With the output signal from AND gate 470 set high or one, multiplexer (MUX) 460 will transmit the contents of FMP alias register 440 rather than the contents of the cell pass-thru register 450 to the cluster adapter 75. All other times when the AND gate 470 output signal is low or equal to zero, the MUX 460 will transmit the data input from the cell pass-thru register 450. Thus, source WQ 300, source Macid 290, and destination Macid 270 would be passed to the cluster adapter 75 unchanged while the destination WQ 280 would have the value contained in the FMP alias register 440 transmitted to the cluster adapter 75.

Therefore, using the FMP alias reception circuit 400 shown in FIG. 4 it is possible for FM server 120 to broadcast to all ports on every device in the NGIO 10 network a single FMP 240 without any knowledge by the FM server 120 of the devices on the NGIO 10 network and the number of ports on a device. Further, when a single cluster adapter has several input ports, the FMP alias reception circuit 400 will prevent overwriting of memory by FMP 240 reception from one port by another port on the cluster adapter 75.

Figure 5:
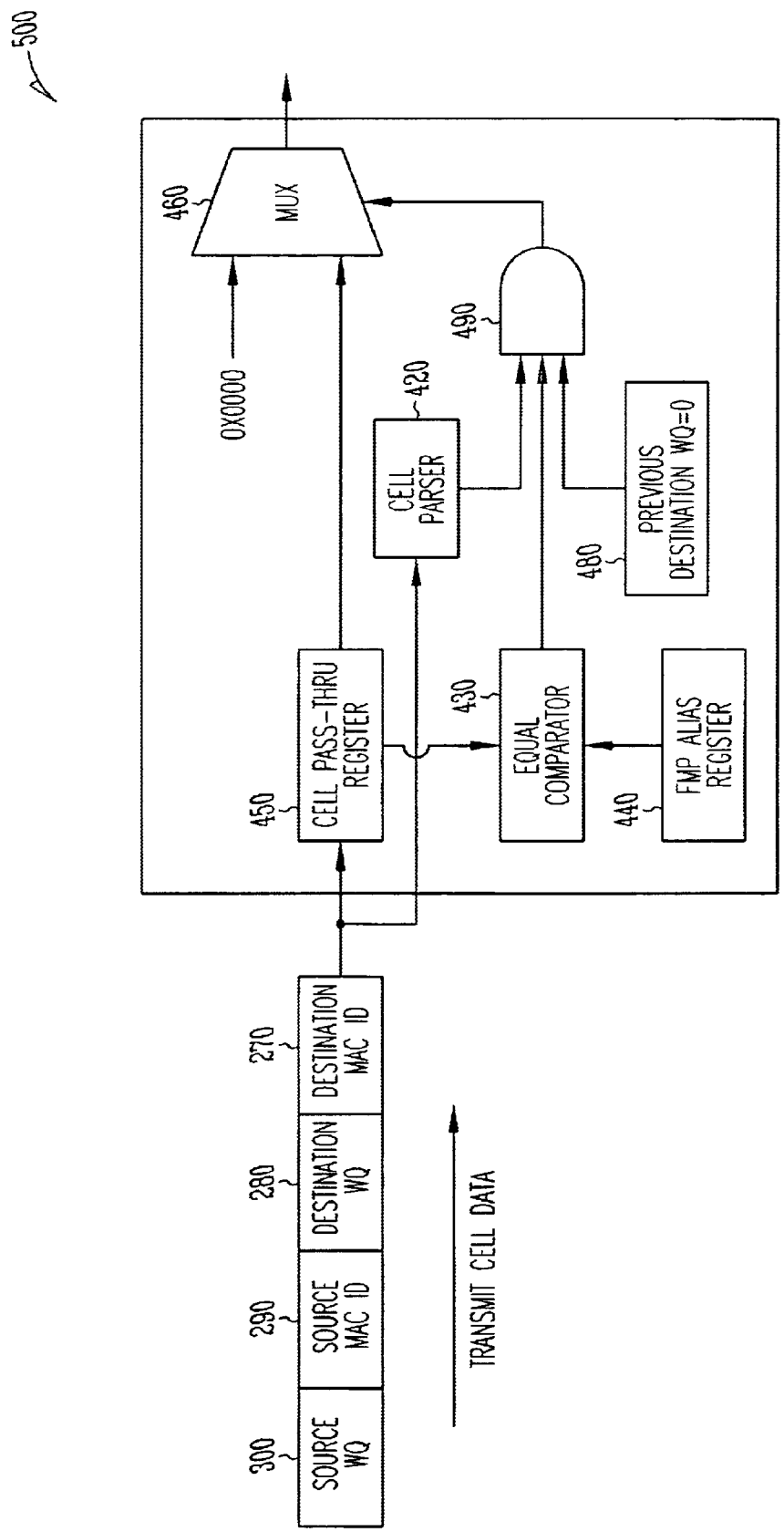
FIG. 5 is an example of a fabric management alias transmission circuit used in an embodiment of the present invention.

FIG. 5 is an example of a FMP alias transmission circuit 500, also referred to as a second circuit, used in an embodiment of the present invention to provide an acknowledgment to the FM server 120. Once the cluster adapter 75 receives a FMP 240, the FM server 120 requires that an acknowledgment be returned. This is accomplished by the cluster adapter 75 replacing the contents the destination WQ 280 with contents of the source WQ 300. Further, the destination Macid 270 has its contents replaced with source Macid 290. In this way the FMP 240 is assured of being returned to its origination point. The source Macid 290 will also be replaced with the original destination Macid 270. However, the source WQ 300 now contains the value stored in the FMP alias register 440. In order to indicate that this is an acknowledgment to a FMP 240 received by the cluster adapter 75, the contents of the source WQ 300 must be replaced with a value of zero. Therefore, it is necessary for a FMP transmission alias circuit 500 to be able to identify an acknowledgment of a FMP 240 and substitute the value zero for the contents of the source WQ 300.

Still referring to FIG. 5, the cluster adapter 75 will transmit the source WQ 300, the source Macid 290, the destination WQ 280, and the destination Macid 270 to the port which originally received the FMP 240. The foregoing values are received simultaneously by both a call pass-thru register 450 and a cell parser 420. As with FIG. 4, cell parser 420 simply counts the number of bytes being transmitted to it. Once the cell parser 420 has counted four bytes, as shown in FIG. 3, the cell parser 420 will set a signal to high or one which is connected to an AND gate 490. In addition, the cell pass-thru register 450 will transmit the byte received from the cluster adapter 75 to an equal comparator 430. The equal comparator 430 compares the data received with that contained in the FMP alias register 440. If the byte received from the call pass-thru register 450 matches that in the FMP alias register 440, then comparator 430 will set a signal connected to AND gate 490 to high or one. Thereafter, a previous destination WQ bit 480 equals zero determination is made and if the destination WQ bit 480 of the corresponding cell was equal to zero a third signal to the AND gate 490 is set high or equal to one. With all three input signals to AND gate 490 set high or to one, a signal connecting the AND gate 490 to MUX 460 is set high or equal to one. If this signal from AND gate 490 is set high or equal to one, the MUX 460 will substitute the value zero for the source WQ 300.

Using this FMP transmission alias circuit 500 an acknowledgment can be sent to the FM server 120 which can be recognized by the FM server 120 as an acknowledgment to a FMP 240. By using the FMP alias reception circuit 400 and the FMP transmission alias circuit 500 it is possible for the FM server 120 to broadcast a general FMP 240 which may be responded to by all ports on all devices connected to the NGIO 10 network. Further, even when a cluster adapter 75 has more the one port contained within it, the FMPs 240 received by other ports on the cluster adapter 75 will not overwrite each other.

Figure 6:
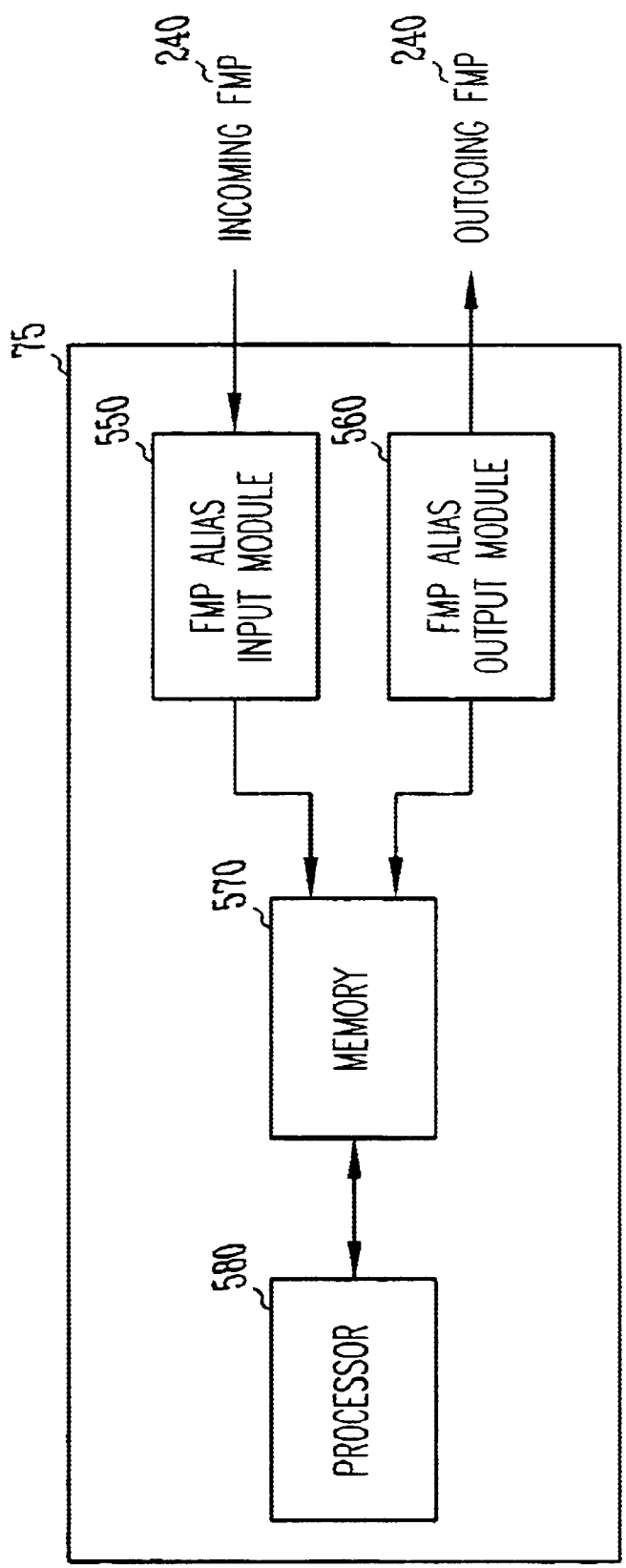
FIG. 6 is an example modular configuration diagram used by the embodiments of the present invention.
Figure 7:
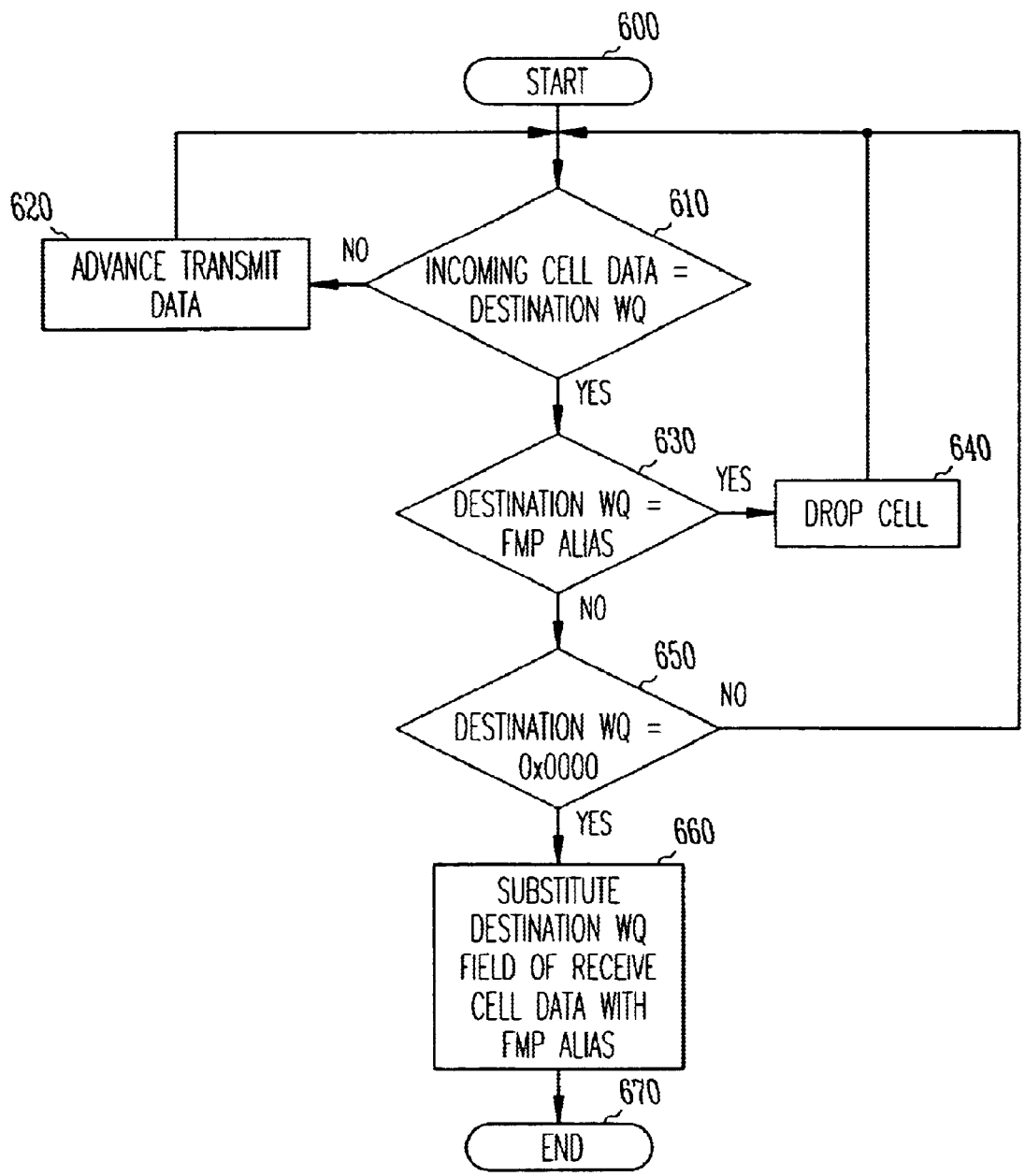
FIG. 7 is an example flowchart of a fabric management packet alias input module, shown in FIG. 6, used in an embodiment of the present invention.
Figure 8:
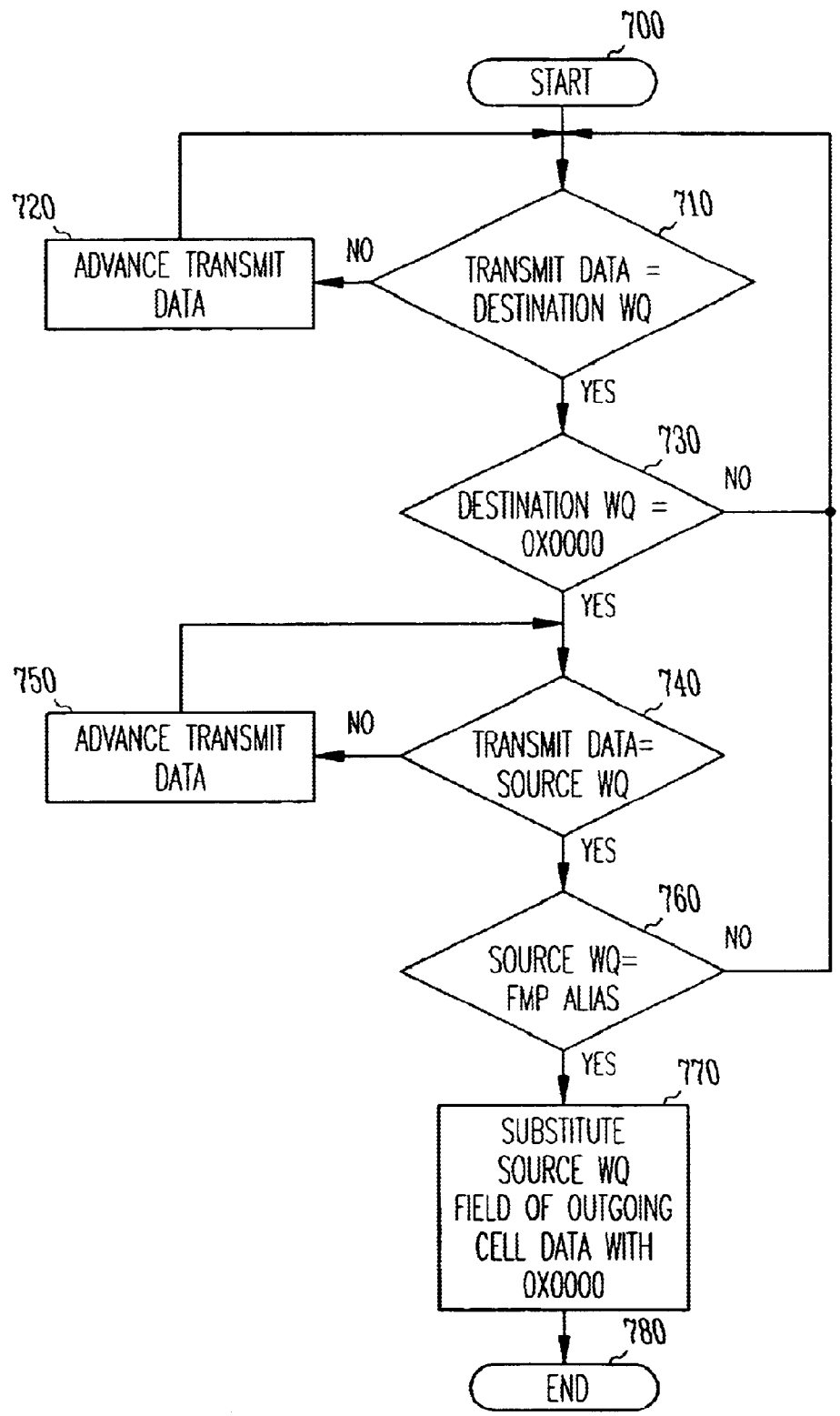
FIG. 8 is an example flowchart of a fabric management packet alias output module, shown in FIG. 6, used in an embodiment of the present invention.

FIG. 6 is a modular diagram of another example embodiment of the present invention using software, commands, firmware, hardware, instructions, computer programs, subroutines, code and code segments which is discussed in reference to the example flowcharts provided in FIG. 7 and FIG. 8. The modules shown in FIG. 6 may take any form of logic executable by a processor, including, but not limited to, programming languages, such as C++. FIG. 6 shows a FMP alias input module 550 that includes operations 600 through 670, shown in FIG. 7. As can be seen in FIG. 6, the FMP alias input module 550 receives the incoming FMP 240 and in turn stores the altered FMP 240 in memory 570 so that cluster server 75 processor 580 can access it to generate an acknowledgment. The alteration of the FMP 240 by the FMP alias input module 550 will be discussed further detail ahead.

Still referring to FIG. 6, a FMP alias output module 560 is used to retrieve from memory 570 the acknowledgment generated by the cluster adapter 75 processor 580 and alter it prior to transmitting the FMP 240 to the FM server 120. The operation of the FMP alias output module 560 will be discussed further detail ahead in reference to FIG. 8.

FIG. 7 is a flowchart detailing the processing of the FMP alias module 550 shown in FIG. 6. The FMP alias input module 550 begins execution in operation 600. Immediately thereafter, operation 610 is executed to determine if the incoming cell data is equal to the destination WQ 280. If operation 610 determines that the incoming cell data is not the destination WQ 280, then processing proceeds to operation 620 in which the next byte of the cell data is retrieved. Thereafter, operation 610 is repeated until it is determined that a destination WQ 280 has been received. If a destination WQ 280 has been received processing proceeds to operation 630 where it is determined if the destination WQ 280 equals the FMP alias. This FMP alias was previously created and stored in each port of every cluster adapter 75 by configuration software (not shown). If the destination WQ 280 equals the FMP, alias the processing proceeds to operation 640 where the cell is dropped and processing loops back to operation 610. This is done to prevent a device, other than the FM server 120, on the NGIO 10 network from accidentally or intentionally attempting to reconfigure the NGIO 10 network. If however it is determined in operation 630 that the destination WQ 280 does not equal the FMP alias, then processing proceeds to operation 650. In operation 650 the destination WQ 280 is checked to determine if it contains a value equal to zero. If the destination WQ 280 does not equal zero, then processing loops back to operation 610 since the cell is not a FMP 240. However, if the destination WQ 280 does equal zero then a FMP 240 has been received and processing proceeds to operation 660. In operation 660 the destination WQ 280 field of the received cell data is substituted with the FMP alias. Thereafter, FMP alias input module 550 terminates execution in operation 670.

FIG. 8 is a flowchart detailing the processing of the FMP alias output module 560, shown in FIG. 6. The FMP alias output module 560 begins execution in operation 700 and immediately proceeds to operation 710. In operation 710 it is determined whether the data being transmitted from the cluster adapter 75 is the destination WQ 280. If the data being transmitted is not the destination WQ 280 then processing proceeds to operation 720 where the next byte of the cell data is retrieved and operation 710 is thereafter repeated. However, if it is determined in operation 710 that the transmission data is the destination WQ 280, then processing proceeds to operation 730. In operation 730 it is determined whether the destination WQ 280 has a value of zero. If the destination WQ 280 does not have a zero value then processing loops back to operation 710 and repeats. However, if the destination WQ 280 has a zero value then processing proceeds to operation 740. In operation 740 it is determined whether the data being transmitted is equal to the source WQ 300. If the transmitted data does not equal the source WQ 300 then processing proceeds to operation 750 where the next byte of data is retrieved and operation 740 is repeated. However, if the transmitted data is equal to the source WQ 300, then processing proceeds to operation 760. In operation 760 it is determined whether the source WQ 300 equals the FMP alias. If it is determined that the source WQ 300 does not equal the FMP alias then processing loops back to operation 710. However, if the source WQ 300 equals the FMP alias, then processing proceeds to operation 770. In operation 770 the source WQ 300 field is set to a value of zero prior to it being transmitted to the FM server 120. Thereafter, FMP alias output module 560 terminates execution in operation 780.

The benefit resulting from the embodiments of the present invention is that a fabric manager server 120 can transmit a generic fabric management packet 240 to all ports on all cluster adapters 75 in a NGIO 10 network and receive acknowledgments from every port without specific knowledge of the hardware that is connected to the NGIO 10 network. This enables the simple addition and removal of devices on the NGIO 10 network without modification of the software and without the possibility that a fabric management packet 240 sent to one port on a cluster adapter 75 being overwritten by another fabric management packet 240 sent to a different port on the same cluster adapter. Therefore, using the embodiments of the present invention allows for exceptional flexibility in configuring a network of computer equipment and exceptional flexibility in the modification of a network of computer equipment.

While we have shown and described only a few examples herein, it is understood that numerous changes and modifications as known to those skilled in the art could be made to the example embodiment of the present invention. For example, the embodiments of the present invention may be implemented in hardware, firmware or software. Further, the embodiments of the present invention may be implemented in the ports of such devices as a cluster adapter 75 or switch 80. In addition, the embodiments of the present invention may be implemented on any port used to communicate to an NGIO 10 network or other similar type of network. Therefore, we do not wish to be limited to the details shown and described herein, but intend to cover all such changes and modifications as are encompassed by the scope of the appended claims.

We claim:

1. A device to assign a work queue to receive a request for acknowledgment, comprising:
    a first circuit embedded in a port to identify incoming cell data as a request for acknowledgment from a server and assign a predetermined work queue area assigned to the port for the request for acknowledgment to be placed in by replacing a field in the request for acknowledgment with the predetermined work queue area; and
    a second circuit embedded in the port to identify outgoing cell data as a response to the request for acknowledgment and set a field in the response to the request for acknowledgment to zero before transmitting the response to the request for acknowledgment to the server.

2. The device recited in claim 1, wherein the first circuit is a fabric management packet alias reception circuit.

3. The device recited in claim 1, wherein the second circuit is a fabric management packet alias transmission circuit.

4. The device recited in claim 2, wherein the fabric management packet alias reception circuit further comprises:
    a fabric management register having a memory location of a work queue associated with the port in which the request for acknowledgment is to be stored;
    a first AND gate to cause the request for acknowledgment to be dropped when a first input signal and a second input signal are set high;
    a first equal comparator to determine if a value of a destination work queue of the request for acknowledgment equals the memory location of the fabric management register and set the first input signal high; and
    a cell parser to count the number of bytes received in the request for acknowledgment and set the second input signal high when a predetermined number of bytes is counted.

5. The device recited in claim 2, wherein the fabric management packet alias reception circuit further comprises:
    a fabric management register having a memory location of a work queue associated with the port in which the request for acknowledgment is to be stored;
    a second AND gate to set an output signal high when a first input signal and a second input signal are set high;
    a second equal comparator to determine if a value of a destination work queue of the request for acknowledgment equals zero and set the first input signal high;
    a cell parser to count the number of bytes, received in the request for acknowledgment and set the second input signal high when a predetermined number of bytes is counted;
    a cell pass-thru register to receive the incoming cell data; and
    a multiplexer connected to the cell pass-thru register, the fabric manager packet alias register and the output signal , wherein when the output signal is low the multiplexer receives the cell data from the cell pass-thru register and transmits it to memory and when the output register is high the multiplexer receives the contents of the fabric management packet alias register and transmits it to memory.

6. The device recited in claim 3, wherein the fabric management packet alias transmission circuit further comprises:
    a multiplexer having a first input signal, a second input signal, and third input signal and one output signal, wherein the second input signal always has a value of zero;
    a cell pass-thru register to receive a response caused by the request for acknowledgment and transmit the response as a first input signal to the multiplexer; and
    an AND gate having three input signals and an output signal, wherein the output signal ads as the third input signal to the multiplexer.

7. The device recited in claim 6, wherein the fabric management packet alias transmission circuit further comprises:
    a fabric manager packet alias register containing a memory location of the work queue;
    an equal comparator to determine if the cell data being received by the cell pass-thru register equals the memory location of the work queue contained in the fabric manager packet alias register and setting one of the three input signals to the AND gate high when the cell data being received by the cell pass-thru register equals the memory location of the work queue;
    a cell parser to count the number of bytes transmitted in the response and set another input signal to the AND gate high when a predetermined number of bytes is counted; and
    a previous destination WQ when set to zero causes another input to the AND gate to be set high, wherein when all three inputs to the AND gate are set high the output signal to the multiplexer is set which causes the multiplexer to transmit a zero value for one clock cycle in the response to the request for acknowledgment.

8. A method of assigning a work queue to a request for acknowledgment comprising:
    receiving cell data at a port having a destination work queue field contained in the cell data;
    determining if the destination work queue field contains a value equal to zero;
    substituting a memory location contained in a fabric management packet alias register for the destination work queue field when the destination work queue field contains a value equal to zero; and
    storing the cell data into the location specified by the destination work queue field.

9. The method recited in claim 8, further comprising:
    determining if the destination work queue field contains a value equal to the memory location contained in a fabric management packet alias register; and
    dropping the cell data when the destination work queue field contains a value equal to the memory location contained in a fabric management packet alias register.

10. The method recited in claim 9, further comprising:
determining that a field being examined is not a destination work queue field; and
advancing to the next field in the cell data until the determination is made that the field being examined is the destination work queue field.

11. The method recited in claim 8, further comprising:
determining if a source work queue field in outgoing cell data contains a value equal to the memory location contained in the fabric management packet alias register; and
replacing the source work queue field in the outgoing cell data with the value zero when the source work queue field in outgoing cell data contains a value equal to the memory location contained in the fabric management packet alias register.

12. The method recited in claim 11, further comprising:
advancing the cell data to a next field until the destination work queue is discovered.

13. The method recited in claim 12, further comprising:
advancing the cell data until a source work queue field is discovered.

14. A computer program executable by a computer and embodied on a computer readable medium, comprising:
a FMP alias input module code segment to receive incoming cell data and determine if the incoming cell data is a request for an acknowledgment by analyzing the destination work queue field of the cell data; and
a FMP alias output module code segment to transmit outgoing cell data and substitute a value of zero for the source work queue field when it is determined that the outgoing cell data is a response to the request of an acknowledgment.

15. The computer program recited in claim 14, wherein the FMP alias input module code segment will advance the cell data to the next field until the destination work queue is discovered.

16. The computer program recited in claim 15, wherein the FMP alias input module code segment, upon discovery of the destination work queue field, will determine if the value contained in the destination work queue equals that stored in a FMP alias register.

17. The computer program recited in claim 16, wherein when the FMP alias input module code segment determines that the destination work queue field equals that stored in a FMP alias register, the FMP alias input module will drop the incoming cell data.

18. The computer program recited in claim 15, wherein the FMP alias input module code segment will determine if the value contained in the destination work queue field equals zero and substitute a memory location value located in a FMP alias register for the destination work queue field when the destination work queue equals zero.

19. The computer program recited in claim 14, wherein the FMP alias output module code segment will determine if the destination work queue field is equal to zero and determine if the source work queue field is equal to the contents of the FMP alias register.

20. The computer program recited in claim 19, the FMP alias output module will set the source work queue field to zero and transmit the response to the request for acknowledgment to the server when both the destination work queue field and the source work queue field are equal to zero.

* * * * *